3,176,513
FEEDING AND METERING THE FLOW OF FLUENT MATERIAL THROUGH A CONDUIT
Eduard W. Kriete, Baltimore, Md., assignor to Western Electric Company, Incorporated, New York, N.Y., a corporation of New York
Filed Mar. 29, 1962, Ser. No. 183,570
3 Claims. (Cl. 73—194)

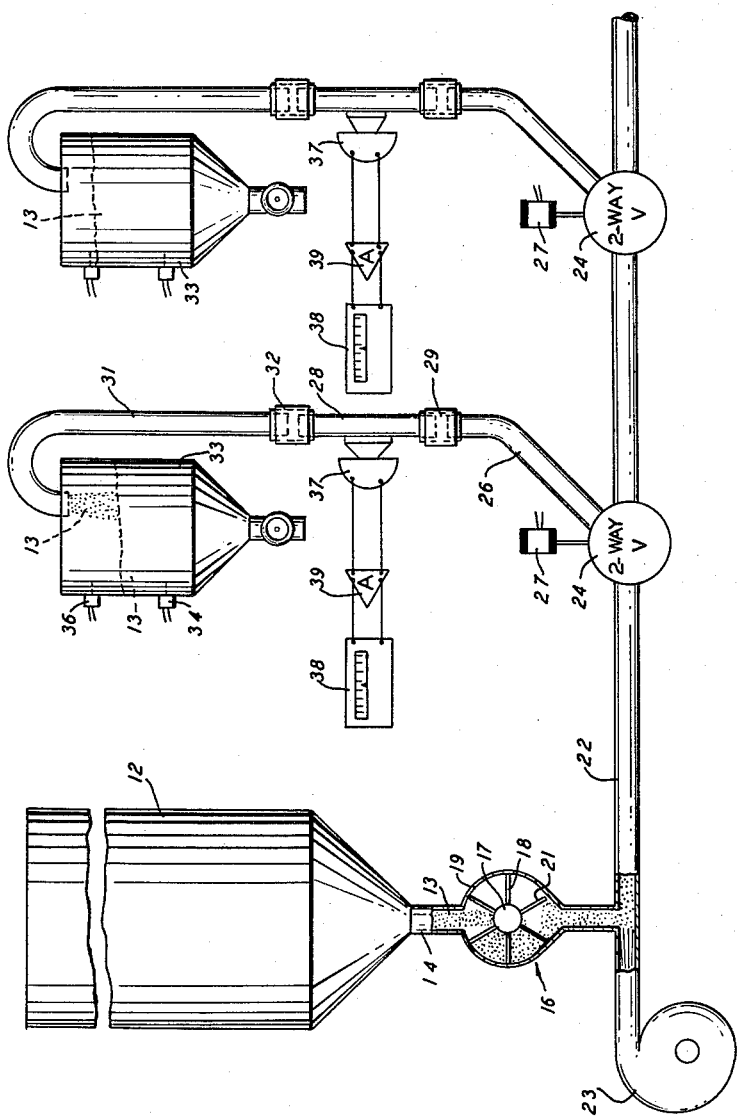

This invention relates to the movement of material in conduits and pipe lines and has for its primary object feeding and metering the flow of fluent material through a conduit.

Another object of this invention is to provide methods and apparatus for isolating a portion of a conduit so that vibrations developed by the passage of granular material within the isolated conduit may actuate a recording means to record the number of individual discrete quantities of material passing therethrough.

With these and other objects in mind, the present invention contemplates successively inserting discrete quantities of granular material into a conduit system where, upon the passage of such discrete quantities of granular material through the conduit, vibrations are developed thereby resulting in a sound wave with the passage of each discrete quantity of material. The successive sound waves developed from the passage of successive discrete quantities of material through the conduit are detected and counted to indicate the total quantity of material passed through the conduit for any desired time interval.

Referring to the figure, a conventional pneumatic conveyor system 11 is provided with a hopper 12 containing granular material 13 therein. The granular material 13 is gravity fed from the hopper 12 through a passage 14 to a multiple-cavity, rotary, dispensing valve, generally designated by the reference numeral 16. The dispensing valve 16 is positioned within the passage 14 and is provided with a shaft 17 which is slowly rotated by a motor (not shown). A plurality of separators 18 extend radially from the shaft 17 and are contained within an enlarged portion 19 of the passage 14 thereby providing a plurality of cavities 21 between adjacent separators 18. As the shaft 17 is slowly rotated by the motor, discrete quantities of granular material 13 are deposited within the cavities 21 and are contained therein as the shaft 17 continues to rotate. Eventually the individual, discrete deposits of granular material 13 are periodically fed by gravitation into a main conduit line 22 where a pneumatic means 23 provides a pneumatic force within the conduit 22 to urge the discrete quantities of granular material 13 through the conduit 22. It is to be noted that the feeding is periodical and dependent upon the speed of the motor rotating the shaft 17.

An electrically controlled two-way valve 24 connects the conduit 22 to a branch conduit 26 wherein the two-way valve 24 is controlled by a solenoid 27. The branch conduit 26 is connected to one end of an isolated conduit 28 by a first vibration-absorbing coupling 29. The opposite extremity of the isolated conduit 28 is connected to a discharge conduit 31 through a second vibration-absorbing coupling 32. A processing apparatus hopper 33 is positioned to receive the discrete quantities of granular material 13 as they are discharged from the discharge conduit 31.

A switch 34 is positioned near the lower end of the hopper 33 to provide a means for actuating the solenoid 27 and hence the two-way valve 24 when the supply of granular material 13 within the hopper 33 is substantially depleted. In this manner, the two-way valve is positioned to deposit granular material 13 into the hopper 33. As the granular material 13, within hopper 33, reaches a desired level, a switch 36 is actuated to operate the solenoid 27 thereby closing the two-way valve 24 and preventing further feeding of the granular material 13 into the hopper 33.

A microphone unit 37 is positioned adjacent to and spaced from the isolated conduit 28 and is connected to a recording unit 38, such as a digital counter, through an amplifier 39. It is to be noted that the isolated conduit 28 does not make physical contact with and is vibrationally isolated from the conduits 26 and 31 by the couplings 29 and 32. Therefore, as each discrete quantity of granular material is fed through the conduits, a sound wave is developed due to vibrations created within the conduits as a result of the granular material striking the inner walls thereof. Each successive sound wave, which is developed by the vibrations of each successive discrete quantity of granular material passing through the isolated conduit 28, is restricted to the conduit by the couplings 29 and 32. The sound wave is picked up by the microphone unit 37 and converted into an electrical signal which is amplified by the amplifier 39 and utilized to actuate the digital counting recording unit 38. Successive sound waves actuate the recording unit to record the total number of discrete quantities of material delivered to the hopper 33 and, hence, the processing apparatus. Thus it is easily seen that the total amount of fluent or granular material 13 which is deposited into the hopper 33 can be computed by multiplying the amount of material in a discrete quantity by the reading of the recording unit 38.

Additional two-way valves 24 are provided in the conduit 22 for supplying granular material to additional processing apparatuses and hoppers 33.

It is to be understood that the above-described arrangements are simply illustrative of the principles of the invention. Other arrangements may be devised by those skilled in the art which will embody the principles of the invention and fall within the spirit and scope thereof.

What is claimed is:
1. Apparatus for recording the number of successive discrete quantities of fluent material passing through a conduit and generating sound waves by developing vibrations in the conduit wall comprising means for isolating the vibrations developed in a given portion of the conduit length from the vibrations developed in the remaining portions of the conduit length, means for recording the number of discrete quantities of fluent material passing through the conduit, and means responsive to each successive sound wave generated by the vibrations developed in the given portion for actuating the recording means.

2. Apparatus for feeding and measuring fluent material fed from a supply hopper to a processing apparatus comprising a conduit interposed between the supply and the processing apparatus, means connected with the supply for successively feeding discrete quantities of fluent material into the conduit, means for isolating vibrations in a given length of the conduit from the remaining conduit wherein the vibrations are developed in the given length of the conduit by the passage of each successive discrete quantity of fluent material so that a sound wave is generated therefrom, and means responsive to each successive sound wave from the given length of the conduit for recording the number of discrete qunatities of material passing through the conduit.

3. Apparatus for feeding discrete quantities of fluent material from a supply to a processing apparatus and for recording the number of quantities of fluent material comprising a rotary dispensing valve adjacent to the supply, wherein the valve is provided with a plurality of cavities for receiving a discrete quantity of a fluent material in each cavity, a conduit interposed between the supply and the processing apparatus, means for rotating the dispensing valve, whereby the discrete quantities of fluent material are periodically dispensed from the dispensing valve to the conduit, means for feeding the fluent material through the conduit and into the processing apparatus, a pair of vibration isolating couplings positioned about spaced points on the conduit to contain within the isolated portion of the conduit vibrations resulting from the passage of each discrete quantity of fluent material therein so that a sound wave is generated, means for recording the number of discrete quantities of fluent material passing through the isolated portion of the conduit, and means responsive to each sound wave generated by the vibrations developed by the passage of each discrete quantity of fluent material within the isolated portion of the conduit for actuating the recording means so that each discrete quantity of material is counted thereby.

References Cited in the file of this patent
UNITED STATES PATENTS
1,215,135    Fisher _____ Feb. 6, 1917